Nov. 3, 1936.  C. SAUZEDDE  2,059,282
HYDRAULIC BRAKING WHEEL SPIDER
Filed Oct. 8, 1931  3 Sheets-Sheet 1
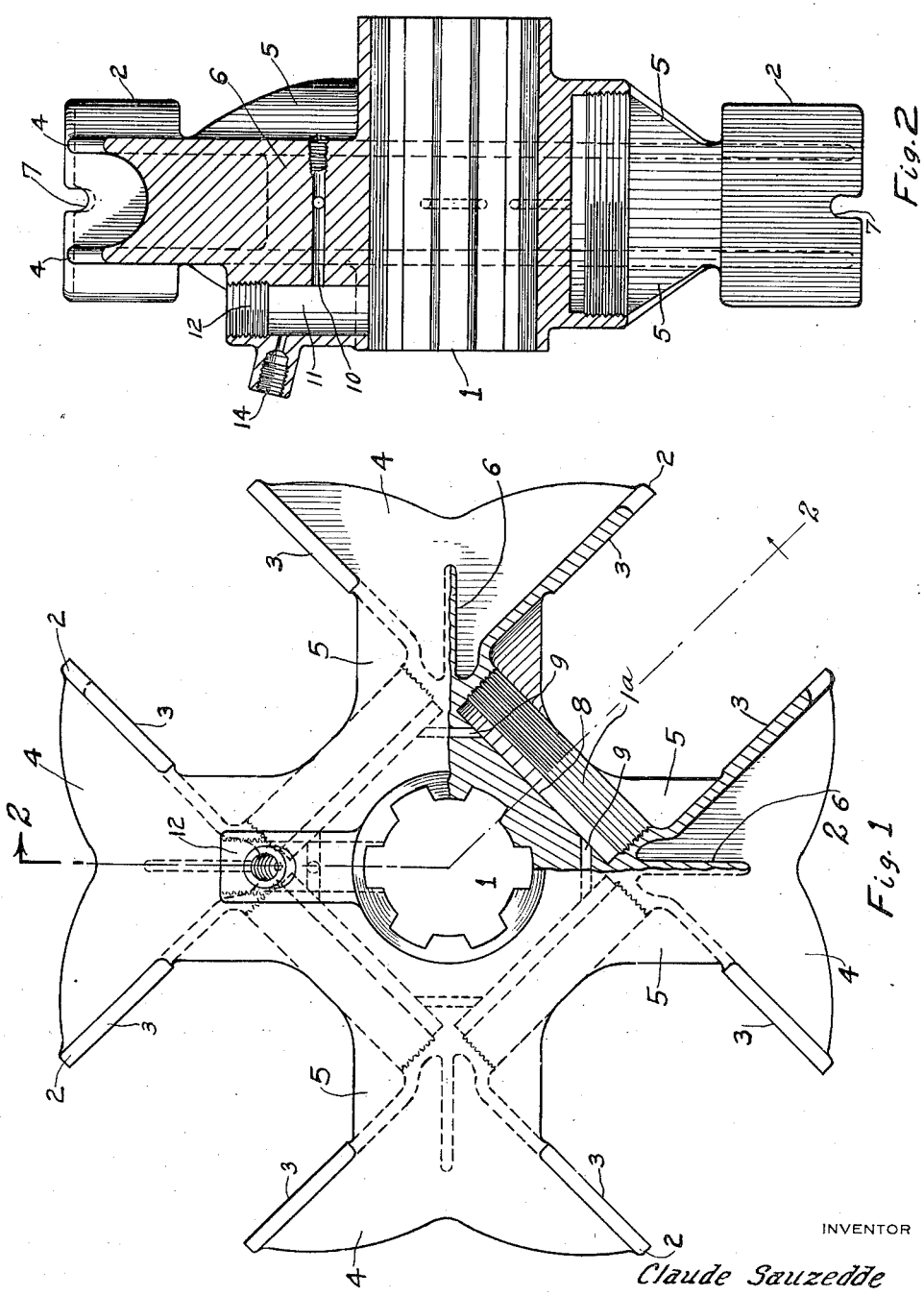
INVENTOR
Claude Sauzedde
BY
ATTORNEYS Nov. 3, 1936.   C. SAUZEDDE   2,059,282
HYDRAULIC BRAKING WHEEL SPIDER
Filed Oct. 8, 1931   3 Sheets-Sheet 2
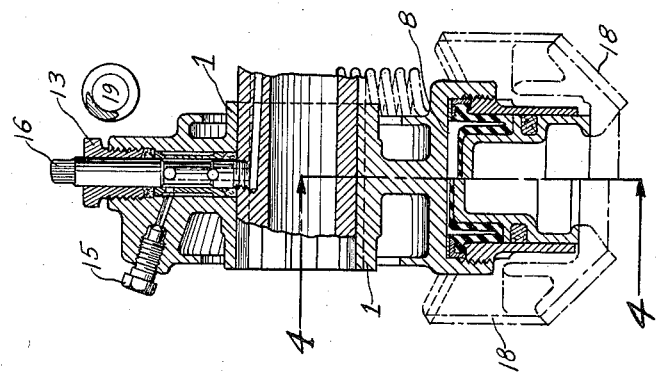
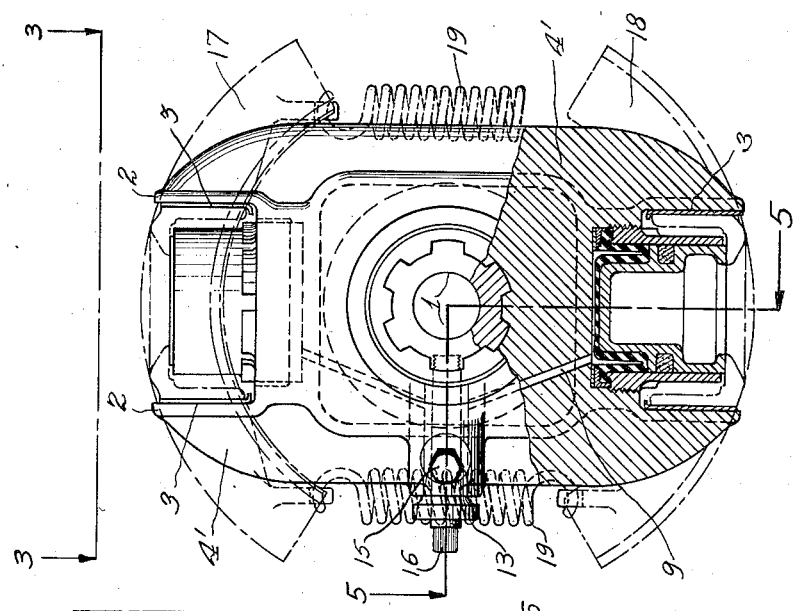
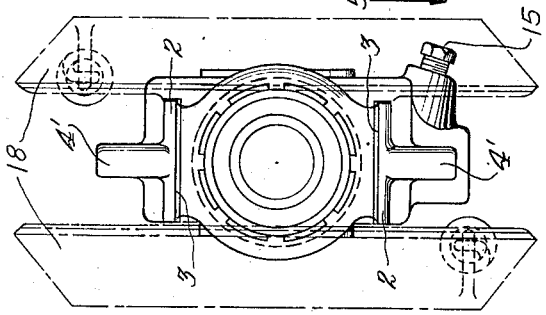
INVENTOR
Claude Sauzedde
ATTORNEYS Nov. 3, 1936.　　　　C. SAUZEDDE　　　　2,059,282
HYDRAULIC BRAKING WHEEL SPIDER
Filed Oct. 8, 1931　　　3 Sheets-Sheet 3

INVENTOR
Claude Sauzedde

ATTORNEYS

Patented Nov. 3, 1936

2,059,282

UNITED STATES PATENT OFFICE 2,059,282

HYDRAULIC BRAKING WHEEL SPIDER

Claude Sauzedde, Detroit, Mich., assignor to Detroit Hydrostatic Brake Corporation, Detroit, Mich., a corporation of Michigan Application October 8, 1931, Serial No. 567,672

11 Claims. (Cl. 188—152)

The present invention relates to multiple-arm supporting structures for wheel-braking mechanism actuated by fluid pressure derived from a source external to the wheel, within the hub of which said braking mechanism is fully inclosed and thereby protected against the harmful action of dust, grit, water, and lubricant on braking surfaces disposed as indicated in co-pending applications, exemplified for instance by the disclosures of applications since issued as Patents No. 2,008,728 and No. 2,019,508.

The chief object of the invention is to provide an inflexible radially-armed structure having a high order of capacity for resisting the unusually heavy torsional stresses set up when conical double-faced sectional-type brake shoes having an unusually large area of "lined" contacting surface are brought into wedging engagement with the oppositely-disposed oppositely-inclined faces of annular braking surfaces forming part of wheel-hub side members between which the supporting structure and mechanism attached thereto are located.

Other objects attained by means of the illustrated structures embodying my invention are presented in the accompanying descriptive and explanatory matter dealing with features that characterize my invention, which has to do with what is termed a spider.

The invention herein disclosed resides in the described combination of constructional, dispositional, and associational features characterizing a unitary structure especially adapted for supporting in non-rotational rigidity yet with comparative freedom of movement radially, to thereby permit wheel-braking mechanism actuated by non-elastic fluid under pressures externally developed by compressing apparatus forming part of the hydraulic wheel-braking system attached to the vehicle, may be efficiently operable in service.

Of the accompanying drawings showing the similar characteristics of two different embodiments of my invention, Figure 1 is a view of a four-armed spider, the view being partly in elevation and partly in section, when viewed in the direction of the axis of the spider;

Fig. 2 is a transverse sectional elevation of the spider along line 2—2 of Fig. 1 showing an integral housing for a fluid distributing valve and a "bleeding" valve through which entrapped air is discharged;

Fig. 3 is a top or plan view of a two-arm spider especially adapted for supporting the hydrostatically-actuated mechanism of braking wheels for lighter vehicles than those with which spiders of the four-arm type shown in Figs. 1 and 2 are used;

Figure 7:
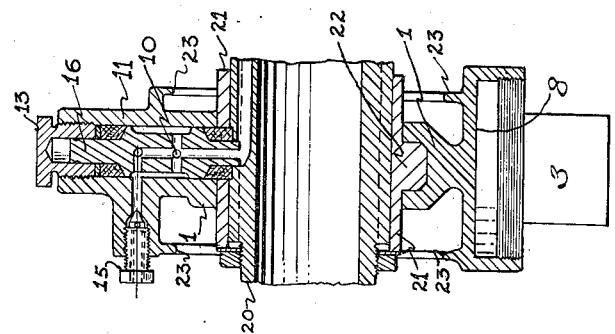
Figure 8:
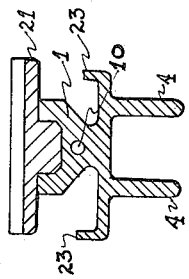
Figure 6:
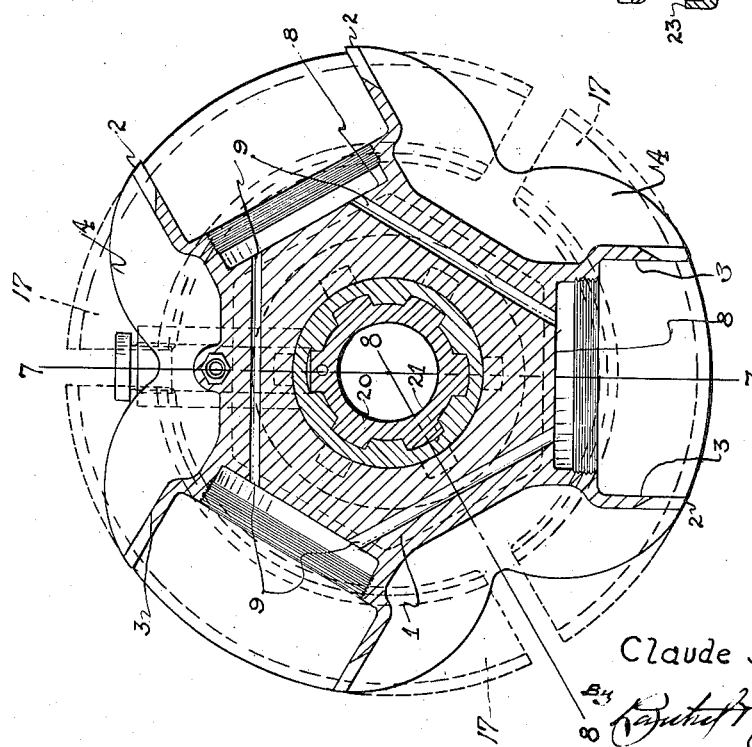

Fig. 4 is a front elevation and fragmentary sectional view along line 4—4 of Fig. 5 of the two-arm spider shown in plan by Fig. 3, associated double-faced brake shoes of conical sectional type and springs by which they are held in normally retracted position being indicated by dotted lines. The sectional part of this view shows the position of attached parts when brake shoe is in its retracted position;

Fig. 5 is a sectional view taken on line 5—5 of Fig. 4;

Fig. 6 is a partly sectioned elevation of a lightweight alloy-metal three-arm spider having an axially-pierced internally-splined steel insert with radially disposed peripheral projections embedded in the hub, from which equally-spaced brake-shoe guiding and supporting arms project radially like the spokes of a wheel;

Fig. 7 is a cross-sectional view of the spider along line 7—7 of Fig. 6 showing the integrally embodied housing for fluid-distributing and air-bleeding valves mounted therein;

Fig. 8 is a sectional view taken on line 8—8 of Fig. 6, the view omitting portions which would appear in rear of the line of section.

Reference characters refer to similar parts in the several views.

The present invention relates more particularly to one of the elements employed in connection with a hydrostatic braking system which is disclosed in various forms in companion applications, one form of which is disclosed, for instance, in my application filed March 31, 1930, Serial No. 440,276 patented July 23, 1935, No. 2,008,728, other applications disclosing various other forms in which the system is embodied. The system itself is designed to utilize a plurality of brake shoe elements—generally arranged to provide spaced segmental braking surfaces adapted to co-operate with complemental braking surfaces carried by the wheel body—this braking mechanism being itself carried within the wheel, the complemental braking surfaces being carried by side members of the wheel. The brake-shoe elements are movable radially, under the action of hydrostatic pressure applied to piston structures which operate the shoes in the direction of brake application, the pistons operating in cylinders which extend radially of the mechanism relative to the wheel axis.

In such system it is essential that the brake elements, which are non-rotative with the wheel, be supported in such manner as to withstand the rotative efforts of the wheel-carried braking surfaces through the frictional contact conditions present when the brakes are set. To provide such support within the limited space permitted by the wheel dimensions, the system employs a spider formation carried by and splined to the stub-shaft of the assembly, this formation supporting the non-rotative portions of the brake mechanism and providing the channel structure by which the hydrostatic fluid is supplied to the respective cylinders from a suitable supply source, which, as indicated in companion applications, is in the form of a suitable compressor or actuator, operated manually under the control of the operator. The formation thus not only serves as a support for the non-rotative members of the brake mechanism but as a distributing medium for the fluid which is to actuate the several pistons of the brake mechanism, the fluid reaching the spider formation through a channel which enters the wheel zone through a channel of the stub axle.

The present invention pertains more particularly to the spider formation of the system, and may vary in structure to meet the needs of the service to be performed by the brake mechanism. For instance, three different forms are disclosed herein, these differing basically in the number of cylinders—and hence brake-shoe elements—used within the brake mechanism. Where the service is of the heavy-duty type, in which the load-weight to be braked is large, a greater number of brake shoes are employed than in the case where the load-weight is lighter. Hence, the spider formation is varied accordingly to meet the changed conditions. Variations may be essential to meet the changes in wheel characteristics, these latter possibly varying the dimension conditions of the space within which the brake mechanism is employed; hence, the formation may become more or less individual to the particular service. But in each of these instances, the spider formation carries the same general characteristics, and it is because of this condition that the formation is being considered as an individual invention of the system itself.

In the drawings, the disclosure of Figures 1 and 2 is that of a spider formation designed for the support of four individual brake-shoe elements through the piston and cylinder structures referred to, these being omitted in these views, being generally illustrated in Figs. 4 and 5, the cylinder being threaded to the spider, with the piston within the cylinder—the latter being open ended at its outer end—the piston itself supporting the brake-shoe element which, as indicated in Figs. 3 and 5 is of two spaced apart members joined by a web which overlies the piston, the members each being segmental and presenting segments of a conical formation.

As indicated in Figs. 1 and 2, the hub zone 1 of the spider is of an axial length sufficient to support the entire non-rotative portion of the brake mechanism, the inner face of the hub being arranged to be splined on to the stub-shaft, the latter being indicated, for instance, at 20 in Fig. 6. The hub zone carries four equally-spaced annular internally-threaded recesses 1a which have their axes each on a radius of the hub zone, the bottom of the recesses being indicated at 8, being a machined face, the inner end of the thread zone being spaced from such face; the threaded zone is designed to receive one of the cylinders referred to, and between its inner end and the face 8 is located an elastic element (Figs. 4 and 5) which underlies the piston and which is clamped in position by the cylinder, the fluid space of the cylinder being between the face 8 and the inner face of the elastic element.

Each of the annular structures additionally carries two arms 2, the inner zone of which merges into the structure by webs 5, while the outer zones are more or less planar and carrying inner faces 3 which confront each other and are located to extend parallel to a plane extending radially through the axis of the cylinder or the recess 1a and lengthwise of the hub axis. The faces 3 are substantially symmetrical to such plane and serve as slide faces for complemental portions of the web connecting the two segmental brake shoes. The faces 3 are thus arranged transverse to the direction of rotation of the wheel, so that they serve to resist movement of the brake shoes in the direction of wheel rotation as well as providing slides to cause the brake shoe elements to move in radial direction.

To support the arms 2, webs 4 extend between adjacent arms of adjacent cylinder supporting structures to serve as braces, and such webs are, in turn, connected by webs 6. Hence, each cylinder zone is braced through the web connection with the adjacent cylinder zones, thus affording maximum support against the pressures developed by the frictional engagement of the opposing braking surfaces, and which is applied to the spider through the faces 3.

As above pointed out, the hydrostatic fluid is made accessible to the spaces adjacent faces 8 through channels leading from the source of supply to a channel in the stub-shaft (Figs. 5 and 7), the latter leading to a formation carried by the spider within an opening 11 (Fig. 2) which, in turn communicates with a channel 10 extending laterally therefrom, said channel being connected with the spaces adjacent faces 9 of the adjacent cylinder zones by channels 9, the several spaces being linked by such connecting channels 9, with the result that as the mobile fluid content of the channels and spaces is varied to provide piston movements, the variations are concurrent within the various spaces and thus provide for uniform movements of the pistons. The formation carried in chamber 11 (and which forms the basis of a companion application) is designed more particularly to permit bleeding of air from the system, when desired—as when initially filling the system with the fluid—the spider carrying a lateral offset 14, having a valve control 15 (Fig. 5) which will enable trapped air to escape upon valve manipulation. The formation, indicated generally at 16, is removable, a closure 13, co-operating with the threaded zone 12 of chamber 11, serving to seal the channel system.

As indicated above, the brake shoe elements are movable radially, the outward—or brake-setting movement—being provided by the fluid pressure. The return movement of the elements is provided by spring pressure, adjacent elements being linked together by springs in a manner such that when the elements are moved outwardly their radial movements will tend to expand the springs to increase tension, the latter then returning the elements to inactive position when the fluid pressure is released. In Fig. 4 the springs 19 are shown as connecting adjacent elements through attachment of the spring ends to lugs carried at the ends of the brake shoe elements; as indicated in Fig. 3, the springs are located at opposite sides and positioned out of the spider zone carrying the cylinders. However, where the number of cylinders is as in Fig. 1—the axes are spaced 90° apart—the ends of adjacent element segments are spaced so close together that this form of connecting the springs would be less favorable, and for this reason the spring ends are then connected to lugs carried by the web of the element, with the result that they then lie within the cylinder zone of the spider. To meet this condition, the arms 2 are preferably provided with recesses 7 (Fig. 2) which permit the spring ends to pass the arms in reaching the webs.

The additional features, referred to above as present in other views, are not shown in Figs. 1 and 2, these figures being designed to indicate the spider formation alone, this being a generally unitary structure. The additional features are disclosed in other views which present other forms of the spider; the showing of Figs. 1 and 2 will, however, indicate generally the features of the remaining views which will present the spider of such views.

As pointed out, the cylinder zone of the spider of Figs. 1 and 2 includes four individual cylinder having their axes spaced 90° apart. In Figs. 3, 4 and 5, the spider presents the cylinder zone as carrying but two cylinders, the axes of these being spaced 180° apart. Hence the arrangement differs somewhat from that of Fig. 1, although the immediate zone of a cylinder is substantially the same. One of the distinctions is the use of a single web 4' instead of the pair of webs 4 of Figs. 1 and 2. Figs. 3 to 5 present some of the additional features referred to, and include the showing of the opposite brake-shoe formations 17 and 18 which, with the connecting web form the brake shoe element.

In Figs. 6 to 8, the spider cylinder zone is shown as having three cylinders, the axes of which are spaced 120° apart. Most of the features of this form are similar to those of Figs. 1 and 2, the differences being mainly due to the wider spacing of the axes. Fig. 6 indicates the use of a special hub insert 21, while Figs. 7 and 8 present inwardly-extending lips 23 to serve to provide the outer walls of annular recesses to receive leakage lubricant which may pass metallic packing seals (not shown) which bear on the insert.

In Fig. 6 are also shown the outline of one of the brake shoe segments of an element, the view showing those for the three cylinders, thus indicating the closeness of the spacing of the ends of adjacent segments referred to in connection with Fig. 1; in this form the springs 19 would lie within the cylinder zone of the spider as in Figs. 1 and 2, thus utilizing the recesses 7.

As will be understood, each form of spider shown presents a formation by which the non-rotative portions of the brake mechanism are especially designed to withstand the various pressures developed in service, the arrangement providing for equalization of the piston advancing movements through the direct interlinking of fluid spaces through channels 9 to provide equal pressure radially on the pistons due to the fact that all pistons are free to move radially until contact of shoe element with the wheel braking surfaces is had, after which the piston radial movements become equal and ensure equal braking activity between the braking elements regardless of inequalities of brake shoe wear. Obviously, through the particular arrangement of slide faces and the bracing of arms, the angular pressures produced by the frictional contact of the opposing braking surfaces sets up an efficient resistance to torsional strains on the non-rotative portion of the braking mechanism.

Having described my invention with sufficient clarity to enable persons skilled in the art to which it relates to understand and make use of it, I claim:

1. In hydraulic wheel-braking mechanism, wherein the mechanism includes a plurality of individual brake shoe members movable radially to braking-surfaces under the control of fluid pressure to render the mechanism active, and wherein the braking surfaces against which the shoes act are carried internally of the wheel hub, means for supporting the brake-shoes individually, said means including a spider fixedly supported in relation to the shaft or spindle on which the wheel hub is mounted, said spider being of unitary type and comprising a hub, pairs of arms projecting from the hub with each pair having its arms extending parallel to a radius of the spider corresponding to the axis of the brake-shoe structure of which the pair of arms forms the support and between which the actuating mechanism for the brake shoe members is located, to form a support for and guide the structure during the radial movements of the latter, and web connections between arms of adjacent pairs to mutually brace the arms to prevent spreading of a pair during brake application.

2. A spider as in claim 1 characterized in that the pairs of arms are similarly located relative to and be intersected by a plane extending normal to the supporting shaft or spindle.

3. A spider as in claim 1 characterized in that the pairs of arms are similarly located relative to and be intersected by a plane extending normal to the axis of the spider hub, the web connections lying in such plane.

4. A spider as in claim 1 characterized in that the arms of a pair are located to be intersected by a plane extending normal to and intersecting the axis of the spider hub, the arms of the pair being free from mutual connection at opposite sides of such plane within the shoe guiding zone of the arms.

5. A spider as in claim 1 characterized in that the hub portion of the spider carries a threaded area axially alined with the axis of the space between a pair of arms to receive a guide for the fluid-pressure actuating means of the brake-shoe structure supported and guided by the arms of the pair.

6. A spider as in claim 1 characterized by a guide element individual to each pair of arms, each element being carried by the spider hub and disposed within the space between a pair of arms, and fluid pressure brake-shoe actuating means individual to and supported by the guiding element and operative on the brake-shoe structure supported by the pair of arms.

7. A spider as in claim 1 characterized by a guide element individual to each pair of arms, each element being carried by the spider hub within the space between a pair of arms, and fluid-pressure brake-shoe actuating means individual to and supported by the guiding element and operative on the brake-shoe structure supported by the pair of arms, the spider hub being channelled to afford communication between such actuating means and a source of fluid pressure supply.

8. A spider as in claim 1 characterized by a guide element individual to each pair of arms, each element being carried by the spider hub and disposed within the space between a pair of arms, fluid pressure brake-shoe actuating means individual to and supported by the guiding element and operative on the brake-shoe structure supported by the pair of arms, the spider hub being channeled to afford communication between such actuating means and a source of fluid-pressure supply, and a bleeder valve structure operatively connected with the hub channels.

9. A spider as in claim 1 characterized by a guide element individual to each pair of arms, each element being carried by the spider hub within the space between a pair of arms, and fluid pressure brake-shoe actuating means individual to and supported by the guiding element and operative on the brake-shoe structure supported by the pair of arms, the spider hub being channelled to afford communication between such actuating means and a source of fluid pressure supply, the hub channellings being arranged to concurrently connect the fluid pressure supply with the several fluid-pressure actuating means.

10. A spider as in claim 1 characterized in that the pairs of arms are symmetrically disposed about the hub of the spider, the number of pairs being not less than two.

11. A spider as in claim 1 characterized in that the pairs of arms are symmetrically disposed about the hub of the spider, the number of pairs being not less than two, all of the pairs being similarly disposed relative to a plane extending normal to the spider hub axis and similarly intersecting the arms.

CLAUDE SAUZEDDE.